Figures 1, 2:
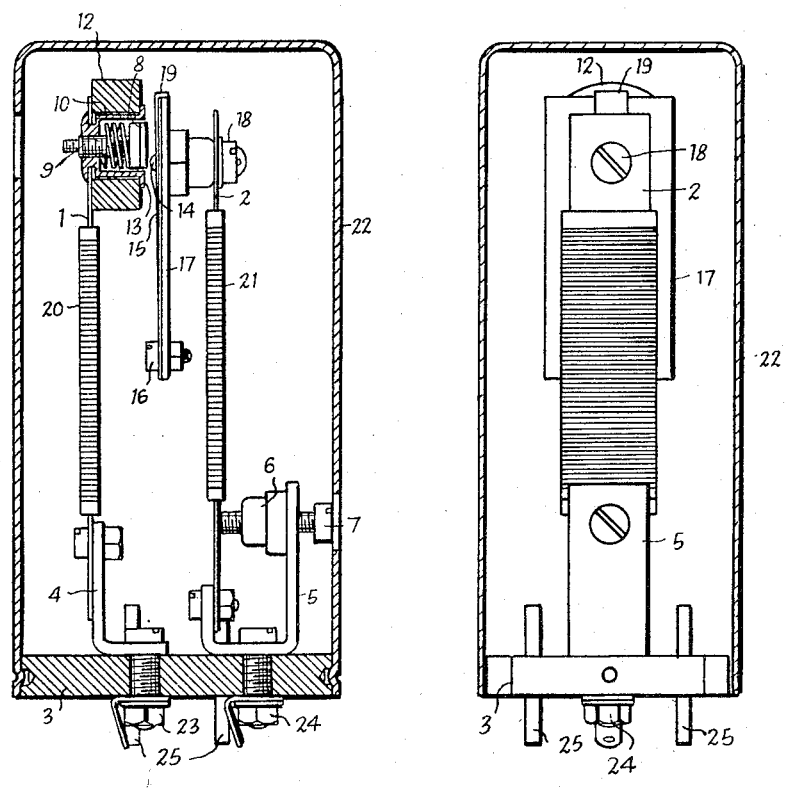

Oct. 5, 1954   C. C. HALL   2,691,129
ELECTRICAL CONTROL ARRANGEMENT
Filed March 28, 1952   3 Sheets-Sheet 1

INVENTOR
Calvin Charles Hall
By Morris N. Bateman
ATTORNEYS

Patented Oct. 5, 1954

2,691,129

UNITED STATES PATENT OFFICE 2,691,129

ELECTRICAL CONTROL ARRANGEMENT

Colin Charles Hall, Harlow, England, assignor to Sunvic Controls Limited, London, England, a company of Great Britain Application March 28, 1952, Serial No. 279,234

Claims priority, application Great Britain April 5, 1951

18 Claims. (Cl. 323—68)

This invention relates to electrical control arrangements of the kind comprising means adapted to produce an electrical output quantity the magnitude of which is dependent upon the magnitude of an electrical input quantity. Control arrangement of this kind are, for example, well adapted for use in control and regulating systems in which the input quantity is dependent upon error in the magnitude of a controlled quantity, which may be of electrical or any other desired nature, from a desired value, and in which the output quantity produces a restoring effect directed to correct the error; in such cases it is frequently desirable, as is well known, that the restoring effect shall be proportional to the magnitude of the error.

The invention relates specifically to control arrangements in which the means above referred to are of the kind, sometimes referred to as energy regulators, comprising thermally responsive means arranged to actuate electrical contacts in an output circuit or circuits and provided with a heating circuit controlled by such contacts so as to maintain the latter in periodic engagement and disengagement. A load circuit including said contacts is energised at an average rate of energy dependent on the relative time periods of contact engagement and disengagement. Said periods are adjustable, in some cases mechanically, and in other cases by electrical control of the heating circuit above referred to or of another heating circuit, which electrical control may provide a continuous or periodic control current or control current component for the heating of the thermally responsive device, dependent in mean effect on the magnitude of a desired quantity of electrical or any other nature.

According to the present invention, an electrical control arrangement comprises two thermally responsive elements, contacts operable by said elements arranged to energise and de-energise a load circuit in dependence on the differential displacements of said elements, a heating circuit for at least one of said thermally responsive elements connected under control of said contacts so as to maintain the latter in intermittent engagement, means for supplying standing currents or current components to heat said thermally responsive elements, and a control circuit for varying the heating of said elements in opposite sense to one another under control of a control or input quantity. By this means the mean power supplied to the load through said contacts will vary in linear or substantially linear relation to the magnitude of said control quantity and remain constant for any given value of said control quantity independently or substantially independently of variations of the supply voltage to the load circuit.

The invention also provides, according to another aspect thereof, an electrical control arrangement comprising two thermally responsive elements, contacts operable by said elements and adapted to be connected for energising and wholly or partly de-energising a load circuit in dependence on the differential displacement of said elements, one or more heating circuits for each of said thermally responsive elements adapted to be connected to supply standing currents or components of current for heating both said thermal elements and for supplying a further heating current or current component to at least one of said elements for causing the heating of the latter to be modified by operation of the contacts whereby to maintain the latter in periodic engagement and disengagement with a ratio of closed time to operating period adjustable by adjustment of said standing currents or current components. In a preferred arrangement the thermal elements comprise bimetal strips mounted parallel with one another and fixed at adjacent ends to a base member with adjusting means for determining the unheated deflection of one of said strips, and adjusting means for determining the relative positions of the free ends of said strips at which the contacts carried thereby are opened or closed.

The invention furthermore comprises a number of further features the nature and scope of which are set forth in the appended claims. Specific embodiments of these features are shown in the accompanying drawings, to which reference will now be made by way of example.

Figure 3:
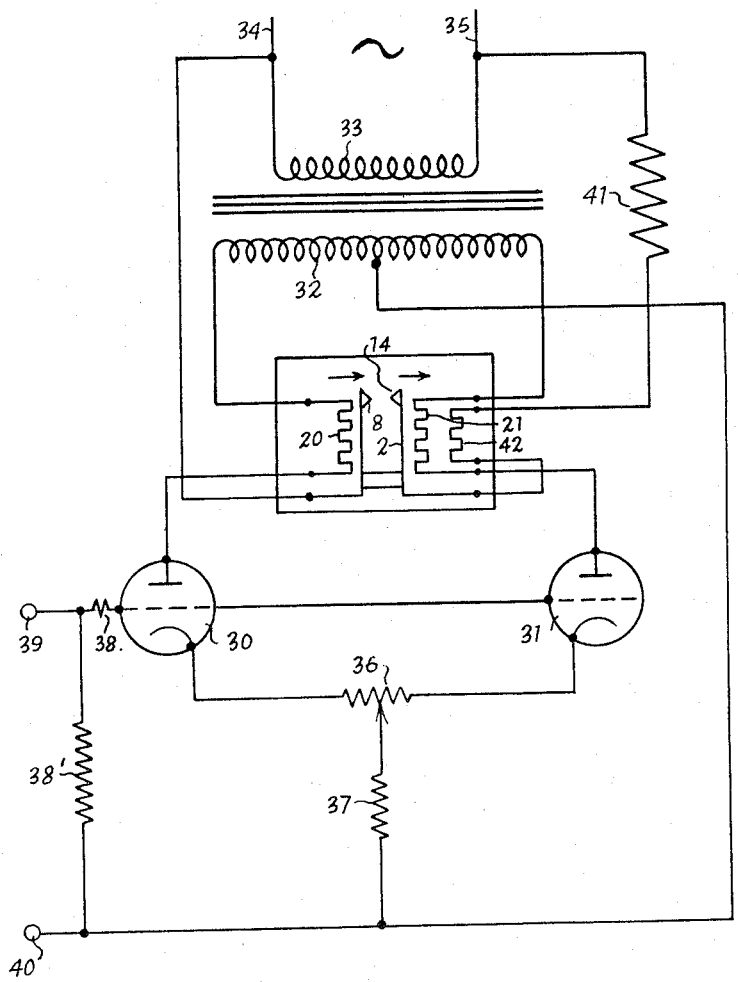
Figure 4:
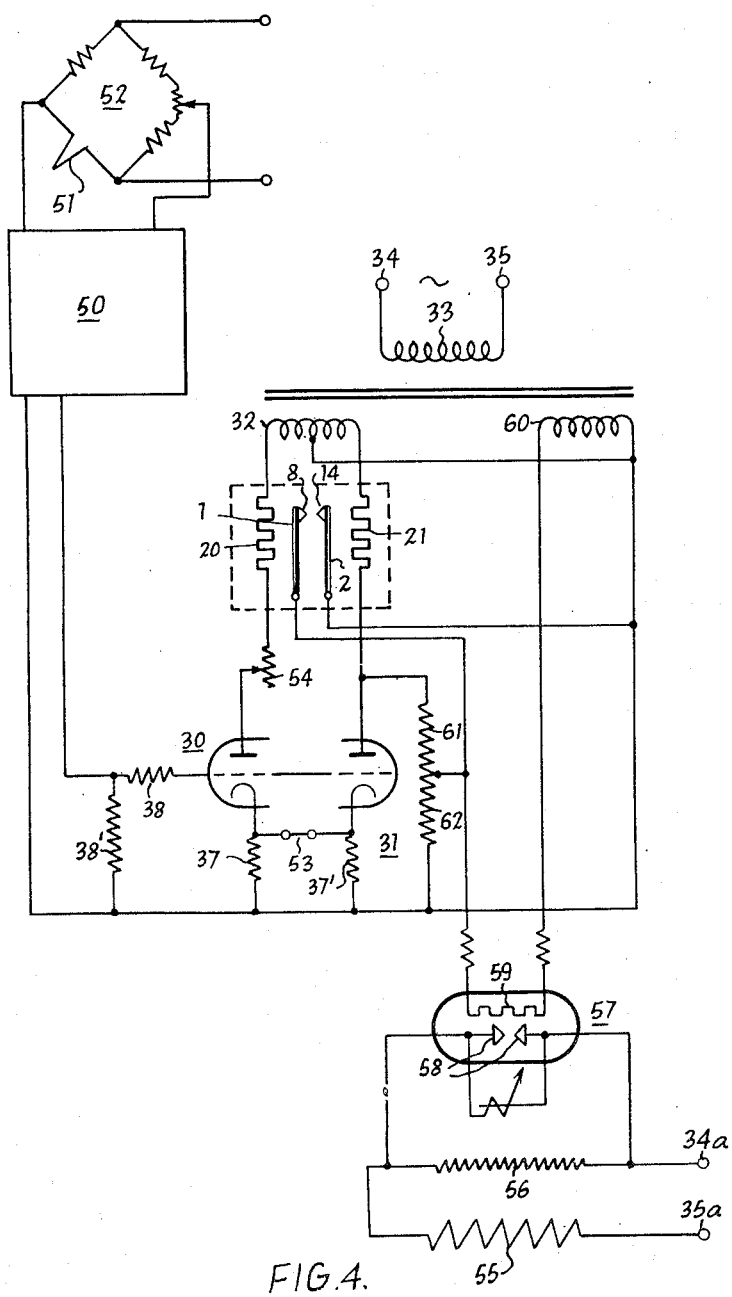

In the drawings,

Figs. 1 and 2 are respectively a mainly sectional side elevation and a partly sectional end elevation of a preferred construction of unitary control arrangement according to the invention, and Figs. 3 and 4 are electrical circuit diagrams showing respectively two control arrangements according to the invention.

In the construction shown in Figs. 1 and 2, two bimetal strips 1 and 2 are mounted on an insulating base 3 by means of metal brackets 4 and 5 to which said strips are respectively bolted. The bracket 5 carries a threaded boss 6 in which is received an adjusting screw 7 which at its left-hand end bears against the bimetal strip 2 and thus provides for positional adjustment of the free upper end of said strip.

A contact 8 is mounted on a screw-threaded stud 9 having engagement within a cup-shaped member 10 which extends through a perforation in the strip 1 and through an annular permanent magnet 12. The member 10 is riveted over the strip 1 and carries a flange 13 whereby to secure the intermediate member to the free upper end of the strip 1.

A contact 14 is carried by a spring blade 15 which at one end is secured by a bolt 16 to a strip of magnetic material 17 in turn bolted at 18 to the free end of the strip 2.

The magnet 12 co-operates with the magnetic plate 17 so as to provide snap action of the contacts on opening and closing. The contact 14 is spring mounted with respect to the plate 17 by means of the spring blade 15, the upper end of which is bent over the upper end of the plate as can be seen at 19 so as to provide a limiting stop for the movement of the contact 14 away from the plate 17.

The bimetal strips 1 and 2 carry heating windings 20 and 21 which are adapted to be connected, such as hereinafter described with reference to Fig. 3 or Fig. 4, in an input circuit so that these windings will carry standing currents which are normally equal to one another but which upon an application of an input voltage to the controlled circuit will cause the standing current associated with one bimetal strip to be increased and that associated with the other bimetal strip to be reduced. The input circuit may be arranged to operate either on direct or alternating current which may in either case be continuous or of constant amplitude or may be periodically interrupted or otherwise varied.

The circuit arrangements are, however, such, as will hereinafter be described, that the bimetal strip 2 is heated also in accordance with the load, being provided in the case of Fig. 3 by means of a separate winding connected in series or parallel with the load, or, as shown in Fig. 4, a single winding on the strip 2 may be arranged to carry a current which is the sum of a standing component and a component dependent upon the supply of current to the load, that is to say is dependent upon the contacts 8 and 14 being closed.

The two bimetal strips are arranged so as to deflect in the same directions as one another with similar changes of temperature whereby the device will be compensated for variations of ambient temperature. In the drawings the bimetal strips move toward the right hand upon increase of temperature.

The stud 9 (Fig. 1), by determining the separation of the plate 17 from the magnet 12 in the closed position of the contacts, determines the differential of the relay, whilst the adjusting screw 7 determines the temperature to which the bimetal strip 1 must be raised above that of the strip 2 in order to cause the contacts to close.

The relay parts may be enclosed in a cover 22 secured to the base 3. The brackets 4 and 5 are preferably secured to the base 3 by terminal screws 23 and 24. Additional terminals such as 25 are provided for the windings on the bimetal strips.

The device of Figs. 1 and 2 may be employed in any suitable circuit whereby the standing currents are varied oppositely to one another and with the heating of one bimetal under control of the contacts 8 and 14 so as to maintain the latter in intermittent engagement. One convenient circuit for this purpose will, however, now be described with reference to Fig. 3 from which the operation of arrangements generally in accordance with the invention will also be apparent with the device as exemplified in Figs. 1 and 2 incorporated in different forms of electrical circuit.

In Fig. 3 the windings 20 and 21 of the bimetal strips are connected in series in the anode circuits of a pair of thermionic valves 30 and 31 for energisation respectively from the ends of a centre tapped secondary winding 32 of a transformer, the primary winding 33 of which is connected with alternating current supply mains 34 and 35. The cathodes are connected through a balancing potentiometer 36 and a cathode resistor 37 with the centre tapping of the winding 32, the resistors 36 and 37 providing automatic bias in well known manner. The grids of the two valves are connected together and through a grid stopper resistance 38 and an input resistor 38' with the negative end of the cathode resistor 37. Input terminals 39 and 40 are provided for connecting the input resistor 38' in any desired input circuit producing an input voltage or current to which the device is required to respond. For example, as is shown in Fig. 4, these terminals may be connected with the output of an amplifier the input circuit of which is controlled by an error responsive device such as a resistance thermometer. A load controlled by the device is illustrated diagrammatically at 41 and is connected in series with the contacts 8 and 14 for energisation from the supply mains 34 and 35. The load circuit also includes in series a further heating winding 42 on the bimetal strip 2.

The potentiometer 36 is adjusted so that with zero input voltage at the terminals 39 and 40, the R. M. S. currents in the two valves 30 and 31 will be equal to one another. Assuming the contacts 8 and 14 to be closed, current is supplied to the load 41 and also to the heating winding 42. The temperature of the bimetal strip 2 is therefore increased eventually to move contact 14 away from contact 8 with snap-action. The current to the load 41 and for heating the bimetal strip is therefore interrupted so that the contact 14 re-engages the contact 8 and this cycle of operation continues. The arrangement therefore operates as an energy regulator providing a given average energy input to the load which will be independent of variations in the supply voltage since the heating of the bimetal strip is subject to the same variations of voltage as are applied to the load circuit. The ratio of contact closed to contact open times will depend upon the mean relative positions of the strips, and therefore upon the difference in mean temperatures of the strips. Assuming that in the absence of an input voltage to the push-pull valves the standing currents of the latter are equal to one another, then the contact operation is determined solely by the mechanical adjustment of the relative positions of the bimetal strips to provide a corresponding mean output energy. The abutment screw 7 provides for ready mechanical adjustment of said relative positions.

Assuming an alternating input voltage is applied to the terminals 39 and 40 and that this voltage is in phase with the supply voltage at 34 and 35, the anode current of the valve 30 will be increased and that of the valve 31 decreased. The current in the winding 20 being increased, said current will be equal to the sum of the standing current $I$ and the change $i$ thereof proportional to said input voltage, whilst the current in the winding 21 being decreased, will be equal to the difference between the standing current $I$ and the change $i$ thereof due to the input voltage. The power supplied to the bimetals by the windings 20 and 21 is proportional to the square of the currents in said windings, namely of the currents $I+i$ in winding 20 and $I-i$ in the winding 21. If the temperature of each bimetal is proportional to the power supplied to heat the bimetal and if, furthermore, the deflection of each bimetal is proportional to the temperature thereof, then the change in setting of the energy regulator is proportional to the difference between the powers supplied to the two bimetals respectively, that is to say to $(I+i)^2-(I-i)^2$. The mean energy supplied to the load is therefore proportional to $I \times i$ and if $I$ (the standing current) is constant, to $i$.

Assuming therefore that the changes in the control currents are proportional to the input voltage, that is to say in the case of the push-pull valve arrangement shown in Fig. 3 that the valve characteristics are linear, then the value of mean energy to which the devise is set will also be proportional to the input voltage.

For a reversed input voltage when the grid voltages are 180° out of phase with the main voltage, the anode current of valve 30 will be reduced and that of valve 31 increased so that the energy output of the contacts 8 and 14 will be reduced again proportionally or substantially proportionally to the magnitude of the input signal.

The circuit arrangement shown in Fig. 3 is operative with error responsive or other input voltages of alternating kind; in many control systems such input voltage is most conveniently of alternating kind, for example is obtained from the A. C. output of an amplifier, irrespectively of whether the input circuit to the latter is controlled by an alternating or direct current quantity.

The value of mean energy in the output circuit is proportional to the input voltage irrespectively of varations in the supply voltage to the load circuit. The arrangement is therefore eminently adapted for use in closed cycle control or regulating systems in which the input voltage is responsive to the deviation of the regulated quantity, for example the temperature of a furnace, from a desired value although it will be understood that the invention is not limited to this application.

The arrangement may also be used so as to obtain an output which is proportional to the product of two functions by causing the standing current to vary proportionally to one function, whilst the input voltage as hereinbefore indicated is varied proportionally to the other function which, however, must be unidirectional.

The output from the contacts may be utilised in any desired load circuit controlling any desired quantity, electrical or otherwise, according to the application of the arrangement, whilst the input voltage may also be varied in accordance with any desired quantity to which the output is required to respond, either in a closed cycle control system in accordance with the errors in the regulated quantity, or otherwise. The circuit arrangements whereby the standing currents in the two control windings are varied in opposite senses in accordance with a common input voltage or quantity may be of any suitable kind.

Arrangements as shown have the advantage of automatically limiting the anode currents when the input voltages are large so that, for examle, in the case of an error controlled system the output of the arrangement is limited for large deviations of the control quantity from the required value, such as in initially bringing a furnace to the required operating temperature, without stability requirements imposing limitation in the sensitivity of the system to small errors and consequent accurate maintenance of the required temperature.

The contacts may control the whole of the input to the load. Alternatively the contacts may control only a portion of such input, for example the contacts may be connected in parallel with a series resistor for the load (as will be described with reference to Fig. 4) or in series with a separate part of the load, for example one of the windings of a two-winding furnace, the other of which windings is connected directly with the supply source, and therefore usually subject to considerable variation of voltage. In such cases the bimetal strip is preferably also arranged to be heated in accordance with that part of the input to the load which is not subject to control by the contacts of the arrangement, and so that the ratio of such further heating of the bimetal to that causing the intermittent operation of the contacts is the same, or substantially the same, as the ratio of the power in the uncontrolled part of the load to the power in the controlled part of the load.

In the case in which the contacts are connected in parallel with a series resistor, the winding already referred to for causing the intermittent opening of the contact will inherently provide the required control in accordance with the ratio above referred to. In the case of separate parts of the load such as separate furnace windings, the bimetal in question may, for example, carry an additional winding connected either in series or in parallel with the part of the load which is supplied independently of the contacts of the arrangement.

As will be clear to those skilled in the art, various other arrangements may be devised whereby the requisite heating of the bimetal in the manner just above set forth is obtained.

As hereinbefore indicated, the standing and control currents may be applied to separate windings as is the case in Fig. 3 or may be applied as components in a single resultant current traversing the common heating winding. An arrangement of the latter kind is shown in Fig. 4 which, for convenience, will be assumed to be applied to the temperature control of a furnace. As in Fig. 3, the bimetal strips 1 and 2 are heated by windings 20 and 21 connected in the anode circuits of valves 30 and 31 supplied from opposite ends of a tapped secondary winding 32 of a transformer, the primary winding 33 of which is energised from the alternating current supply mains 34 and 35. An input resistor 38' is supplied from the output of an alternating current amplifier 50 the input circuit of which includes a desired error responsive device such as a resistance thermometer 51 connected in a resistance bridge 52. The cathodes 30 and 31 are connected respectively with separate cathode resistors 37 and 37' which are normally connected together by a removable link 53. This link may be removed and a meter inserted so that the standing currents of the two valves may be adjusted to equality by means of a rheostat 54 in the anode circuit of one valve.

In the example illustrated, the arrangement is applied to a furnace having a heating winding 55 connected across the alternating current supply mains 34a, 35a in series with a resistance 56 which is adapted to be short circuited by closure of the contacts 8 and 14. For this purpose a relay 57 is preferably employed which may be of the electromagnetic or as illustrated of the vacuum switch type. Thus normally open contacts 58 of the relay are connected across the resistor 56 and a heating winding 59 adapted to cause closing of said contacts is connected in series with the contacts 8 and 14 in a circuit energised from a further winding 60 of the transformer.

Resistors 61 and 62 are connected in parallel with the anode-cathode path of the valve 31, the common point of these resistors being connected with the contact 8.

The winding 20 carries the anode current of the valve 30 whereas the winding 21 carries the sum of the anode current of valve 31 and the current in the resistive network 61 and 62. This additional current causes the contact cycling. There is therefore a difference in power input to the two bimetal strips. The device is adjusted so that with the contacts 8 and 14 closed, the extra power in the bimetal strip 2 will cause the temperature of the latter to rise and the contacts will open. As soon as they do so the heating of strip 2 is reduced because the current taken through resistors 61 and 62 is reduced and the bimetal cools down until the contacts reclose. The unit continues to cycle in this manner. The change in current in winding 21 due to the short-circuiting of resistor 62 by the closing of the contacts 8 and 14 is equivalent to the power increment provided in 55 in short-circuiting of resistor 56, and the current drawn through resistors 61 and 62 with the contacts 8 and 14 open is equivalent to the standing power in 55 when resistor 56 is in circuit.

The output relay 57 is connected to a potential point such that substantially no current flows in the heater winding 59 when the contacts 8 and 14 are open.

What I claim is:

1. An electrical control arrangement comprising in combination, first and second thermally responsive elements, switch contacts mechanically connected with said elements for actuation by differential displacement of said elements, a load circuit including said contacts, a heating circuit for at least one of said thermally responsive elements, said heating circuit being under control of said contacts to cause alternate opening and closing of the contacts, and a control circuit including electrical signal producing means and heating means for said first and second thermally responsive elements to increase the heating of said first thermally responsive element and to reduce the heating of said second thermally responsive element in response to a variation in one sense of the operative condition of said signal producing means, and to reduce the heating of said first element and increase the heating of said second element in response to variation in the other sense of the operative condition of the signal producing means.

2. An electrical control arrangement comprising in combination, first and second thermally responsive elements, switch contacts mechanically connected with said elements for actuation by differential displacement of said elements, output conductors connected with said contacts, a heating circuit for at least one of said thermally responsive elements, said heating circuit being under control of said contacts to cause alternate opening and closing of the contacts, and a control circuit including electrical signal producing means and heating means for said first and second thermally responsive elements to increase the heating of said first thermally responsive element and to reduce the heating of said second thermally responsive element in response to a variation in one sense of the operative condition of said signal producing means, and to reduce the heating of said first element and increase the heating of said second element in response to variation in the other sense of the operative condition of the signal producing means.

3. An electrical control arrangement comprising in combination, first and second thermally responsive elements, switch contacts mechanically connected with said elements for actuation by differential displacement of said elements, output conductors connected with said contacts, a heating circuit for at least one of said thermally responsive elements, said heating circuit being under control of said contacts to cause alternate opening and closing of the contacts, and a control circuit including input conductors and heating means for said first and second thermally responsive elements to increase the heating of said first thermally responsive element and to reduce the heating of said second thermally responsive element in response to a variation in one sense of a signal applied to said input conductors and to reduce the heating of said first element and increase the heating of said second element in response to variation in the other sense of the signal applied to said input conductors.

4. An electrical control arrangement comprising in combination, first and second bimetal strips disposed at least substantially parallel with one another, co-operating switch contacts mechanically connected with said strips, respectively, for relative movement by differential displacement of said strips, snap-action means associated with said contacts, a load circuit including said contacts, a heating circuit for at least one of said bimetal strips, said heating circuit being under control of said contacts to cause alternate opening and closing of the contacts, and a control circuit including electrical input signal producing means and heating means for said first and second strips to increase the heating of said first strip and to reduce the heating of said second strip in response to a variation in one sense of the operative condition of said signal producing means, and to reduce the heating of said first strip and increase the heating of said second strip in response to variation in the other sense of the operative condition of the signal producing means.

5. An electrical control arrangement comprising in combination, first and second bimetal strips disposed at least substantially parallel with one another, co-operating switch contacts mechanically connected with said strips, respectively, for relative movement by differential displacement of said strips, snap-action means associated with said contacts, output conductors associated with said contacts, a heating circuit for at least one of said strips, said heating circuit being under control of said contacts to cause alternate opening and closing of the contacts, and a control circuit including input conductors and heating means for said first and second bimetal strips to increase the heating of said first strip and to reduce the heating of said second strip in response to a variation in one sense of a signal applied to said input conductors, and to reduce the heating of said first strip and increase the heating of said second strip in response to variation in the other sense of the signal applied to said conductors.

6. An electrical control arrangement comprising in combination, a base member, first and second bimetal strips disposed at least substantially parallel with one another and mounted at adjacent ends on said base member, a contact adjustably mounted on the free end of one of said strips, a co-operating contact mounted on the free end of the other of said strips for relative movement by differential displacement of said strips, snap-action means associated with said contacts, output conductors associated with said contacts, a heating circuit for at least one of said bimetal strips, said heating circuit being under control of said contacts to cause alternate opening and closing of the contacts, a control circuit including electrical input-signal producing means and heating means for said first and second strips to increase the heating of said first strip and to reduce the heating of said second strip in response to a variation in one sense of a signal applied to said input conductors, and to reduce the heating of said first strip and increase the heating of said second strip in response to variation in the other sense of the signal applied to said conductors.

7. An electrical control arrangement comprising in combination, a base member, first and second bimetal strips disposed at least substantially parallel with one another and mounted at adjacent ends on said base member, a contact adjustably mounted on the free end of one strip, a co-operating contact mounted on the free end of the other of said strips for relative movement by differential displacement of said strips, snap-action means associated with said contacts, an adjustable abutment engaging one of said strips adjacent the fixed end thereof to determine the unheated deflection of the free end of said strip, output conductors associated with said contacts, a heating circuit for at least one of said strips, said heating circuit being under control of said contacts to casue alternate opening and closing of the contacts, and a control circuit including input conductors and heating means for said first and second strips to increase the heating of said first strip and to reduce the heating of said second strip in response to a variation in one sense of a signal applied to said input conductors, and to reduce the heating of said first strip and increase the heating of said second strip in response to variation in the other sense of the signal applied to said conductors.

8. An electrical control arrangement comprising in combination, first and second thermally responsive elements, switch contacts mechanically connected with said elements for actuation by differential displacement of said elements, output conductors connected with said contacts, a heating circuit for at least one of said thermally responsive elements, said heating circuit being under control of said contacts to cause alternate opening and closing of the contacts, a control circuit including push-pull thermionic valves having anodes connected to supply heating currents to said first and second thermally responsive elements respectively, input conductors connected with the grids of said valves whereby to increase the heating of said first thermally responsive element and to reduce the heating of said second thermally responsive element in response to a variation in one sense of a signal applied to said input conductors and to reduce the heating of said first element and increase the heating of said second element in response to variation in the other sense of the signal applied to said input conductors.

9. An electrical control arrangement comprising in combination, first and second bimetal strips disposed at least substantially parallel with one another, co-operating switch contacts mechanically connected with said strips, respectively, for relative movement by differential displacement of said elements, snap-action means associated with said contacts, output conductors associated with said contacts, a heating circuit for at least one of said strips, said heating circuit being under control of said contacts to cause alternate opening and closing of the contacts, a control circuit including push-pull thermionic valves having anodes connected to supply heating currents to said first and second thermally responsive elements respectively, input conductors connected with the grids of said valves whereby to increase the heating of said first thermally responsive element and to reduce the heating of said second thermally responsive element in response to a variation in one sense of a signal applied to said input conductors and to reduce the heating of said first element and increase the heating of said second element in response to variation in the other sense of the signal applied to said input conductors.

10. An electrical control arrangement comprising in combination, first and second thermally responsive elements, switch contacts mechanically connected with said elements for actuation by differential displacement of said elements, output conductors connected with said contacts, heating elements for said thermally responsive elements, a heating current path for one of said heating elements including said contacts to cause alternate opening and closing of the contacts, a control circuit including second and third heating current paths for said heating elements, respectively, and included in circuit with the input of said control circuit to increase the heating of said first thermally responsive element and to reduce the heating of said second thermally responsive element in response to a variation in one sense of a signal applied to said input and to reduce the heating of said first element and increase the heating of said second element in response to variation in the other sense of the signal applied to said input.

11. An electrical control arrangement comprising in combination, first and second thermally responsive elements, switch contacts mechanically connected with said elements for actuation by differential displacement of said elements, output conductors connected with said contacts, a pair of push-pull thermionic valves, a heating element for one of said thermally responsive elements connected with two parallel heating current paths including respectively said contacts and in the anode circuit of one said valves to cause alternate opening and closing of the contacts, a heating element for the other of said thermally responsive elements connected with the anode circuit of the other of said valves, and input conductors connected with the grids of said valves whereby to increase the heating of said first thermally responsive element and to reduce the heating of said second thermally responsive element in response to a variation in on sense of a signal applied to said input conductors and to reduce the heating of said first element and increase the heating of said second element in response to variation in the other sense of the signal applied to said input conductors.

12. An electrical control arrangement comprising in combination, first and second thermally responsive elements, switch contacts mechanically connected with said elements for actuation by differential displacement of said elements, regulating means responsive to current in said contacts, a heating circuit for at least one of said thermally responsive elements, said heating circuit being under control of said contacts to cause alternate opening and closing of the contacts, and a control circuit including electrical input signal producing means responsive to departure of a regulated quantity from a predetermined value, and heating means for said first and second thermally responsive elements included in circuit with said signal producing means to increase the heating of said first thermally responsive element and to reduce the heating of said second thermally responsive element in response to a variation in one sense of said regulated quantity, and to reduce the heating of said first element and increase the heating of said second element in response to variation in the other sense of said regulated quantity.

13. An electrical control arrangement comprising in combination, first and second bimetal strips disposed at least substantially parallel with one another, co-operating switch contacts mechanically connected with said strips, respectively, for relative movement by differential displacement of said elements, a circuit including said contacts and regulating means responsive to current in said circuit, a heating circuit for at least one of said thermally responsive elements, said heating circuit being under control of said contacts to cause alternate opening and closing of the contacts, and a control circuit including electrical input signal producing means responsive to departure of a regulated quantity from a predetermined value, and heating means for said first and second thermally responsive elements included in circuit with said signal producing means to increase the heating of said first thermally responsive element and to reduce the heating of said second thermally responsive element in response to a variation in one sense of said regulated quantity, and to reduce the heating of said first element and increase the heating of said second element in response to variation in the other sense of said regulated quantity.

14. An electrical control arrangement comprising in combination, first and second thermally responsive elements, switch contacts mechanically connected with said elements for actuation by differential displacement of said elements, conductors connected with said contacts and including regulating means responsive to current in said conductors, a heating circuit for at least one of said thermally responsive elements, said heating circuit being under control of said contacts to cause alternate opening and closing of the contacts, and a control circuit including a pair of push-pull thermionic valves having anodes connected to supply heating current to said first and second thermally responsive elements respectively, means responsive to departure of a regulated quantity from a predetermined value connected with the grids of said valves to thereby increase the heating of said first thermally responsive element and to reduce the heating of said second thermally responsive element in response to a variation in one sense of said regulated quantity, and to reduce the heating of said first element and increase the heating of said second element in response to variation in the other sense of said regulated quantity.

15. An electrical control arrangement as defined in claim 1, in which said switch contacts control part of the input to the load circuit and said thermally responsive element heated under control of said contacts to cause alternate opening and closing of the latter is heated in accordance with said part of the load and the remaining part of the load, the ratio of heating in accordance with said parts of the load being at least substantially the same as the ratio of power in said parts of the load.

16. An electrical control arrangement as defined in claim 2, including means responsive to a second input signal for varying the heating currents of said thermally responsive elements proportionally to said second input voltage whereby the output current in said contacts is proportional to the product of the two input signals.

17. An electrical control arrangement comprising in combination, first and second thermally responsive elements, switch contacts mechanically connected with said elements for actuation by differential displacement of said elements, output conductors connected with said contacts, a heating circuit for at least one of said thermally responsive elements, said heating circuit being under control of said contacts to cause alternate opening and closing of the contacts, and an alternating current control circuit including push-pull thermionic valves having anodes connected to supply heating currents to said first and second thermally responsive elements respectively during alternate half cycles and reversible phase control means connected with the grids of said valves to increase the heating of said first thermally responsive element and to reduce the heating of said second thermally responsive element in response to a variation in one sense of an alternating current signal in said control means and to reduce the heating of said first element and increase the heating of said second element in response to variation in the other sense of the alternating current signal in said control means.

18. An electrical control arrangement comprising in combination, first and second bimetal strips disposed at least substantially parallel with one another, co-operating switch contacts mechanically connected with said strips respectively for relative movement by differential displacement of said strips, snap-action means associated with said contacts, a load circuit including said contacts, a heating circuit for at least one of said bimetal strips, said heating circuit being under control of said contacts to cause alternate opening and closing of the contacts, and an alternating current control circuit including push-pull thermionic valves having anodes connected to supply heating currents to said first and second bimetal strips respectively during alternate half cycles and reversible phase control means connected with the grids of said valves to increase the heating of said first bimetal strip and to reduce the heating of said second bimetal strip in response to a variation in one sense of an alternating current signal in said control means and to reduce the heating of said first bimetal strip and increase the heating of said second bimetal strip in response to variation in the other sense of the alternating current signal in said control means.

References Cited in the file of this patent

FOREIGN PATENTS

| Number | Country | Date |
|--------|---------|------|
| 538,118 | Great Britain | July 22, 1941 |